Jan. 8, 1946.    J. C. CLIFTON ET AL    2,392,461
HARDNESS CALCULATING DEVICE
Filed July 14, 1942
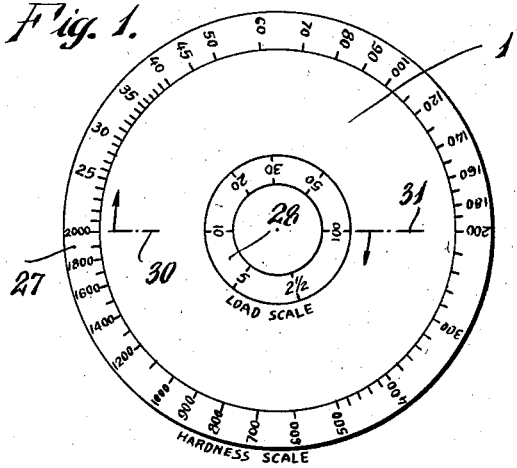
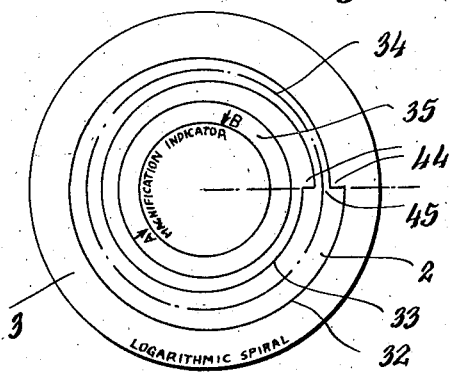
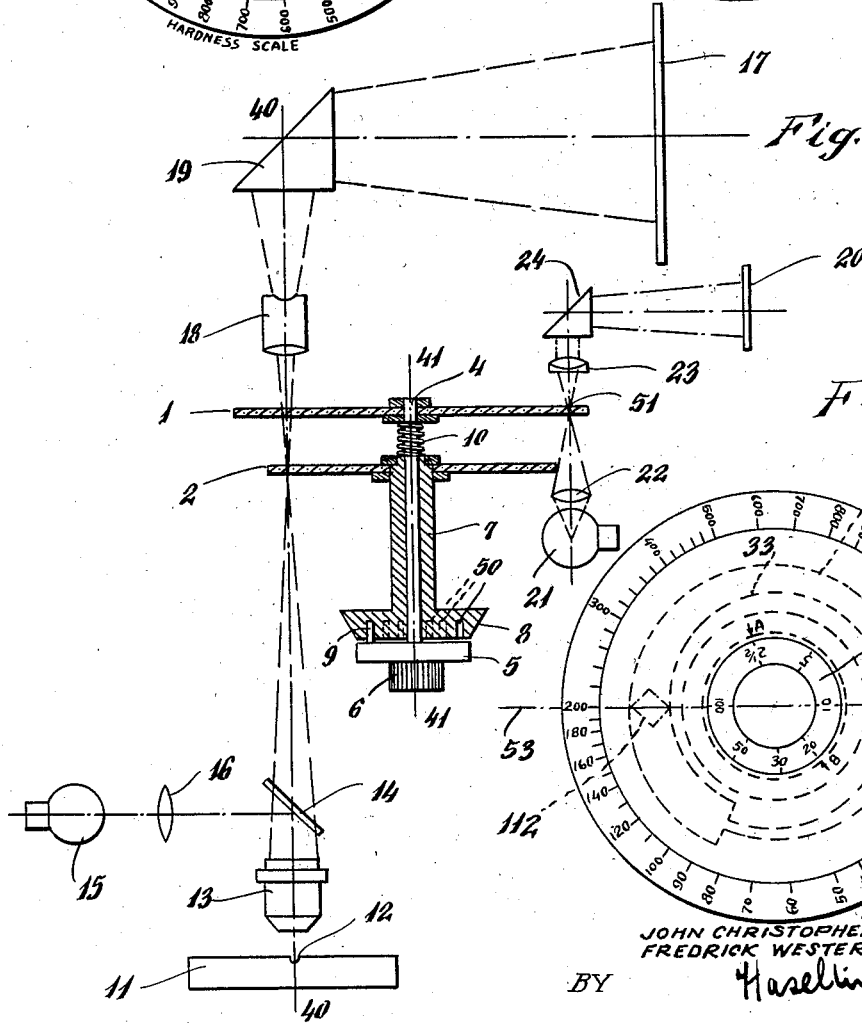
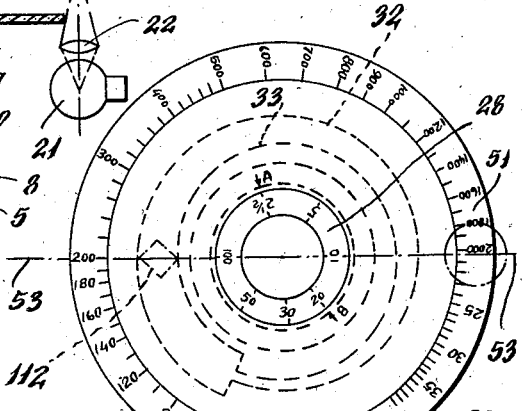
INVENTORS
JOHN CHRISTOPHER CLIFTON
FREDRICK WESTERMAN RABARTS
BY Haseltine Lake & Co.
ATTORNEYS Patented Jan. 8, 1946

2,392,461

UNITED STATES PATENT OFFICE 2,392,461

HARDNESS CALCULATING DEVICE

John Christopher Clifton, New Eltham, London, S. E. 9, and Frederick Westerman Rabarts, Bexley, England, assignors to Vickers-Armstrongs Limited, London, England, a British company Application July 14, 1942, Serial No. 450,944
In Great Britain July 10, 1941

3 Claims. (Cl. 73—81)

This invention relates to apparatus for the direct numerical evaluation of hardness numerals from the observation of impressions made by means of a penetrometer under various values of loading.

The object of the invention is to provide apparatus whereby the numerical value of the hardness can be directly read off on a scale forming part of the apparatus, by measurement of the impression made by the penetrometer, and further so to construct the measuring apparatus, that this direct reading is established even though the conditions of observation of such impression, and also the conditions which produce it, are varied separately or collectively. It will be appreciated that the direct reading provided by the apparatus, which is the subject of the present invention may, if desired, be optically transferred to a screen, or otherwise suitably disposed for reading the recorded values, either separately from, or in conjunction with, the optical image of the visual mark being measured.

According to the invention, the apparatus for the direct numerical evaluation of hardness from the observation of an impression made on metals under a definite load by means of penetrometer under specified conditions, comprises two axially mounted transparent discs. One of the discs is suitably inscribed with logarithmic scales of corresponding values of the load and the hardness for a constant given size of impression, the other disc with a double-sided equiangular logarithmic spiral, the angular distances from a given origin representing, on a logarithmic scale the areas of the impression, or the squares of a linear dimension of the impression, i. e. diameter of a circular impression, or diagonal of a square impression, or the like, which dimension determines the size of the surface of the impression. The segments of the radii between the sides of the spiral represent the lengths or a constant multiple of the lengths of said determining linear dimension. The discs are adapted to be pivotally displaced against each other for bringing said scales on the one of said discs and said spiral on the other of said discs to a definite angular relationship depending on the load which was used when making the impression. The doublesided equiangular logarithmic spiral is adapted to caliper said determining linear dimension, the calipering angular position then indicating on the hardness scale the hardness value of the metal on which the impression had been made.

In order that the invention may be more clearly understood the same will now be described with reference to the accompanying diagrammatic drawing in which:

Figure 1 shows one movable element of the apparatus,

Figure 2 shows the second movable element,

Figure 3 illustrates the general arrangement of the apparatus and associated projection systems, Figure 4 is a plan view corresponding to Figure 3.

For the purpose of evaluating hardness numerals it is necessary in order to obtain satisfactory conditions of test to make observations of impressions made under different values of loading and magnification and it has been established that the hardness numeral varies directly as the load used to make the impression and inversely as the square of the linear dimensions of the impression produced. If L is the load, $d$ a linear dimension of the impression determining the size of its surface, such as, if circular its diameter, or if square its diagonal, H the hardness, and C a constant, then $$L = C \cdot d^2 \cdot H \qquad (1)$$

From this form of the mathematical relation between the variables L, $d$, H, follows that when all variables are varying together, the logarithm of the hardness number is always equal to the logarithm of the load, minus twice the logarithm of the determining linear dimension of the impression, plus a constant:

$$\log H = \log L - 2 \log d + \log C \qquad (2)$$

If therefore, we lay out on one of two elements slidable against each other, comparable to a logarithmic slide rule, logarithmic scales of corresponding values of the load and of the hardness and on the other an appropriate representation of twice the logarithms of the determining linear dimension, we, by displacing the two elements relatively to each other, or by bringing the logarithmic representation of the values $d$ in a definite spatial relationship to the load scale depending on the value of the load used, may evaluate the value of the variable H from any value of the determining linear dimension $d$ of the impression.

If in the second element, by the use of an optical system in the apparatus, a magnified image of the impression is used instead of the impression itself, the linear dimension $d$ will appear magnified to D, the factor of the linear magnification being $m$, ($D = m \cdot d$), Equation 2 will read:

$$\log H = \log L - 2 \log D + 2 \log m + \log c \qquad (3)$$

that means that in order to obtain the hardness number at a given load and a given size of the impression, the displacement of the second element is to be diminished by a displacement corresponding to the value of the magnification or $2 \log m$.

As elements slidable against each other, we employ two circular discs 1 and 2, respectively illustrated in Figs. 1 and 2. The discs are rotatable about a common axis 41—41, Fig. 3, passing normally through their geometric centres.

On the first disc 1 there are inscribed two circular scales 27, 28, the outer scale 27 preferably being used for the hardness numbers and the inner scale 28 for the loads.

Since the variables H, L, $d$ and the optical magnification of the image used to observe and measure the impression, comprise all the variable factors involved, the scales on disc 1 may be laid out in the following manner:

For a constant size of impression the hardness numeral is directly proportional to the load. Starting therefore from chosen initial conditions, this relation will give corresponding values of these two variables, when the size of impression and magnification remain constant.

The corresponding values may conveniently lie on common radii to the two circles, but not necessarily in the same plane. In the instance of Fig. 1 corresponding values of the two scales 27 and 28 are diametrically opposite one another for a purpose which will be explained hereinafter in connection with the description of Fig. 3. The angular spacing of these radii will in general depend upon the mathematical form of the expression connecting all the variables, and in the present case will be distributed around the circumference, from a suitable initial value of the load from an origin indicated at 30 and 31 respectively, over the required range, with the angles proportional to the logarithms of the load and hardness number values.

The second circular disc 2 is mounted concentrically with, but independently of, the disc 1 previously described, the diameter of the disc 2 being preferably somewhat smaller than that of disc 1. The second movable disc is also preferably made of transparent material.

This second element serves as a caliper, preferably an optical caliper, which measures the impression. Simultaneously, the second member serves as the second member of a circular logarithmic slide rule which in the calipering angular position shows the hardness number sought.

We inscribe therefore on this element the varying sizes of the impression, and since, as a rule, a magnified image of the impression is projected on this element by optical means, we may inscribe instead of the direct sizes their magnifications, choosing a suitable magnification factor. This may be taken into account, as Equation 3 shows, by displacing the second member of the circular slide rule against the first member by a constant amount corresponding to twice the logarithm of the linear magnification.

The varying sizes of the impression or their magnifications will be represented on this member as a double curve bordering a spiral, the sides 32, 33, Figs. 2 and 4, of which are functions of the logarithm of the area of, or functions of twice the logarithm determining the linear dimension of the impression.

Against this representation of the varying sizes of the impression or its magnification, the impression or its image is registered, the impression being viewed normally by a microscope, or its image optically transferred to a screen, the initial optic axis of the system passing normally through the centre of the impression, and also normally to the faces of the two movable disc-like elements. The lines 32, 33 inscribed on the second movable element, in the manner about to be described, are situated directly against the impression, as Fig. 4 illustrates at 112, and the portions of the field of view are in focus as well as the impression. The optic axis such as 40—40, Fig. 3 of the optical system used to view the impression 12, and the impression itself, will lie at a convenient radius from the common pivot centre 41—41 of the discs. On the second movable element, the values which determine the curves serving to register against the impression are laid out on the radii, about an imaginary circumference indicated by the dash-point circle 34 in Fig. 2 and described with the radius of the optic axis, and are each evenly divided by circle 34.

As set forth hereinbefore, for any given hardness expressed by a given hardness number, the area of the impression or the square of the linear dimension of the impression varies directly as the load, that is, twice the logarithm of the linear dimension varies as the logarithm of the load.

On any radius such as 44, Fig. 2, which hereinafter I shall term "origin" of the disc, and symmetrically about the imaginary circumference 24 defined above there are laid out, as indicated by 45, 46, respectively, the greatest and least values, over the required range, of the most convenient linear dimensions of the impression or its image, usually multiplied by a suitable magnification factor in accordance with the magnification of the optic system employed. Intermediate values are now laid down radially, with the angles proportional to the logarithms of these values.

The result of this process is that the disc has been inscribed with a double sided, equiangular logarithmic spiral 32, 33 symmetrically disposed about the circumference 34 passing through the centre line of the impression 12 or its projected image 112. This spiral 33, 34, which is used to register against the impression 12 or its image 112, must now be correctly related or brought into correct spatial relationship to the values inscribed on the first element or disc 1, previously described, of the measuring apparatus.

In inscribing this first element a chosen constant size of impression was used to lay out the corresponding values of the load and hardness numerals, and this is the relating factor between the two elements.

The two scales of disc 1, hardness scale 27 and load scale 28, or their respective origins 30, 31, are to be brought into a certain spatial relationship to, or displacement against, the spiral 32, 33, or its origin 44, which takes account of the chosen constant size of the impression which is also expressed by the constant C of the apparatus, and which takes account furthermore of the magnification $m$ of the optic system. These mutual relations of the values are given by Equation 3 which tells that in order to read the hardness number H for a given load L and a given impression $d$, the origin of the logarithmic representation of the impression is to be shifted against the given load point for a length which corresponds to the logarithmic representation of the constant C of the apparatus and the chosen magnification $m$. If the magnification is varied, the corresponding displacement is to be changed. The two displacements, one with relation to the load point, the other expressing the magnification, may be executed as one step, particularly if the optic system is for only one magnification.

We have thus illustrated on disc 2 of Fig. 2 a magnification indicator 35 showing two marks A and B, the mark A being set against the load points, for example "2½" in Fig. 4, when the normal magnification of the optic system of Fig. 3 is to be used. Any setting of the mark A against any load point will simultaneously take account of the displacement (2 log $m$) necessary for the magnification.

If another magnification $m'$ is to be used, we may for instance make use, instead of mark A, of another mark B, the setting of this mark against a load point taking into account for the evaluation simultaneously of the changed magnification $m'$ and the load.

An embodiment of an evaluation apparatus is shown in Fig. 3. The disc is mounted on one end of a shaft 4 which carries at its other end a disc 5. Disc 5 is to be used for setting the displacement between discs 1 and 2 in accordance with the load used when making the impression and the magnification of the optic system. A knurled knob 6 is secured to disc 5 for rotating the shaft 4.

Disc 2 is mounted on a sleeve 7 which is freely rotatable about shaft 4. Discs 5 and 8 may be locked together in a spatial relationship determined by the load and the magnification as just has been described.

For this purpose, disc 5 is provided with a pin 9 which may enter any of a number of holes 50, disc 8 and disc 5 being pressed towards each other by means of a spring arranged on shaft 4, between discs 1 and 2. Discs 1 and 2 may then be rotated by means of knob 6.

On the circumference of disc 5 there may be inscribed the marks A and B, and the edge of disc 8 may carry a reproduction of the load scale not shown on the drawing. Since, however, disc 5 is solidary with disc 1 and disc 8 with disc 2, the sense of displacement between magnification indicator and load scale is to be reversed when compared with the scale and indicator of Fig. 1 and Fig. 2. The indicator and scale are therefore to be reproduced on discs 5 and 8, respectively, as mirror images of the indicator 35 of Fig. 2 and of the load scale of Fig. 1, or Fig. 4.

11 is the test piece and 12 the visual mark or impression formed therein by the penetrometer (not shown).

The optic system for producing a magnified image of the impression consists of a microscope objective 13, a vertical illuminator 14, a projection lamp 15, and a lamp condenser 16.

The optic system for projecting an image of the impression 12 on the viewing screen 17 consists of a projection ocular 18 and a prism 19. The optic system for projecting an image of the relevant part 51 of the hardness scale 27 upon the viewing screen 20 consists of lamp 21, condenser 22, projection lens 23 and prism 24.

Assuming that the impression 12 has been made on the test piece, the hardness number is obtained in the following manner:

The load, for instance "2½," and the magnification being known, the two discs 1 and 2 are suitably coupled together by means of pin 9 and the appropriate pole 50 for instance that mark A points to the load point "2½." Both discs 1 and 2 are rotated by means of knob 6 until the image 112 of the impression 12 is exactly calipered in the logarithmic spiral 3 between its sides 32 and 33, as Fig. 4 illustrates.

The line 53—53 intersecting normally both the common axis of rotation 41—41 of the movable elements 1, 2 and the normal to the impression or optic axis 40—40, will indicate on the hardness scale 27 the hardness number, in this instance "20." This number is shown on the side of the disc diametrically opposed to the image of the impression. In this way both optic systems 13, 14, 16, 15, 18, 19, 17, and 21, 22, 23, 24, 20 may not interfere with each other. Since the margin of disc 1 containing the hardness scale projects over the circumference of disc 2, disc 2 will not obscure or impede the passage of the pencil of rays of the optic system 21, 22, 23.

The hardness number may thus be read directly from disc 2 at 51 or from its projection on screen 20.

Let it be supposed that mark A is brought into coincidence with any given load and fixed in position by means of pin 9 and the appropriate hole 50. If now, the elements 1 and 2 are rotated together by means of the knob 6 until the logarithmic spiral 32—33 calipers the image of the impression 112, the correct hardness numeral will be read off from the outside of the larger disc against the datum line. In practice it is convenient as just has been pointed out to read these values off at a point diametrically opposite to the impression, but this is only equivalent to producing line 53—53 which intersects normally both the common axis 41—41 of rotation of the movable elements 1 and 2 and the normal to the impression 12, or optic axis 40—40, and transferring the graduations to the opposite side of this disc. Also in practice a spring pin location 9, 50, 10 and connection between the two elements corresponding to each load is conveniently provided; the spring pin being conveniently located on the radius with mark A of the logarithmic spiral element and engaging with any one recess or hole in the other element when corresponding with any of the load values.

If the magnification is altered, this is equivalent to having to use on the logarithmic spiral instead of the radius with the mark A, another radius such as the one with mark B as has been described hereinbefore, and if a second spring pin in the appropriate position is provided to connect in a different relative position with the load values on the other movable element, the previous connection being rendered inoperative, the proper values of the hardness numerals for this magnification are indicated against the line 53—53 intersecting normally the common axis 41—41 of rotation and the optic axis 40—40, and read off. If desired several such connections could be provided for different magnifications.

Thus it will be seen that the hardness numerals are directly evaluated by a measuring apparatus constructed in accordance with the invention, under all the possible conditions of carrying out the measurement.

What we claim and desire to secure by Letters Patent of the United States is:

1. An apparatus for the direct numerical evaluation of hardness from the observation of an impression made on metals under a definite load by means of a penetrometer under specified conditions, comprising two coaxially mounted transparent discs, one of said discs being suitably inscribed with logarithmic scales of corresponding values of the load and the hardness for a given constant size of impression, the other of said discs with a doublesided equiangular logarithmic spiral, the angular distances from a given origin of said spiral representing on a logarithmic scale the squares of a determining linear dimension of said impression and the segments of the radii between the sides of said spiral representing the lengths of said dimension; said discs being adapted to be pivotally displaced against each other for bringing said scales on the one of said discs and said spiral on the other of said discs into a definite spatial relationship depending on the load used when making said impression; said doublesided logarithmic spiral adapted to caliper said determining dimension, the calipering angular position indicating on the first of said discs the hardness value of said metal.

2. An apparatus as set forth in claim 1 wherein interengaging locking means are provided on both said discs for interlocking said discs in various positions of said spiral origin relatively to said load scale.

3. An apparatus as set forth in claim 1 wherein an optical system is provided for projecting an image of said impression into focus in the plane of said doublesided spiral.

JOHN CHRISTOPHER CLIFTON.
FREDERICK WESTERMAN RABARTS.